United States Patent [19]

Siekierski et al.

[11] Patent Number: 5,617,164
[45] Date of Patent: Apr. 1, 1997

[54] CAMERA USING INTERFERENCE BETWEEN EXPOSURE ACTUATOR AND METERING LINKAGE TO CONTROL MOTOR

[75] Inventors: Roger A. Siekierski, Webster; Charles W. Greene, Clarence Center, both of N.Y.

[73] Assignee: Eastman Kodak Company, Rochester, N.Y.

[21] Appl. No.: 565,508

[22] Filed: Nov. 30, 1995

[51] Int. Cl.$^6$ ........................................... G03B 1/18
[52] U.S. Cl. ........................................ 396/401; 396/418
[58] Field of Search ........................ 354/173.1, 173.11, 354/204, 212, 213, 215

[56] References Cited

U.S. PATENT DOCUMENTS

| | | | |
|---|---|---|---|
| 3,568,584 | 3/1971 | Harvey | 354/173.1 |
| 3,779,145 | 12/1973 | Ettischer et al. | 354/206 |
| 4,075,644 | 2/1978 | Hosono | 354/173.11 |
| 4,903,061 | 2/1990 | Harvey | 354/213 |
| 5,008,692 | 4/1991 | Diehl et al. | 354/173.1 |
| 5,023,640 | 6/1991 | Diehl | 354/173.1 |
| 5,138,350 | 8/1992 | Cocca | 354/173.1 X |
| 5,235,366 | 8/1993 | Kucmerowski | 354/212 |

FOREIGN PATENT DOCUMENTS 7-43797  2/1995  Japan ............................ G03B 17/00

Primary Examiner—Howard B. Blankenship
Attorney, Agent, or Firm—David A. Howley; Charles E. Snee, III

[57] ABSTRACT

A photographic camera including a metering linkage and an exposure initiation member provided with extensions that interact to: a) block the linkage from energizing a film winding motor in one position of the member; and, b) release the linkage to energize the motor in another position of the member. The first or blocking position corresponds to depression of the member to initiate an exposure. The second or releasing position corresponds to the return of the member to its undepressed condition after initiating the exposure. The exposure initiation member includes a first tab and the metering linkage includes a second tab. In the depressed position of the member, the first and second tabs respectively engage each other, blocking movement of the linkage and thereby preventing energization of the motor. In the non-depressed position of the member, the first and second tabs respectively clear each other, releasing the linkage and energizing the motor. The motor then advances the film and resets the metering linkage. Resetting the linkage deenergizes the motor and interrupts the film advance at the completion of the metering cycle.

11 Claims, 6 Drawing Sheets

CAMERA USING INTERFERENCE BETWEEN EXPOSURE ACTUATOR AND METERING LINKAGE TO CONTROL MOTOR

CROSS REFERENCE TO RELATED APPLICATION

Reference is made to and priority claimed from U.S. Provisional Application Ser. No. U.S. 60/001,590, filed 27 Jul. 1995, entitled CAMERA USING INTERFERENCE BETWEEN EXPOSURE ACTUATOR AND METERING LINKAGE TO CONTROL MOTOR.

FIELD OF INVENTION

The invention relates to field of photography and to cameras for exposing photographic film. More specifically, the invention relates film winding and metering mechanisms in such cameras for successively advancing respective film frames into an exposure position.

BACKGROUND OF THE INVENTION

The invention is applicable to many camera designs, but has particular utility in low cost and single use cameras according to the preferred embodiment of the invention.

Single use cameras are assembled from relatively inexpensive components and sold with the film included. During manufacture, a film cartridge, typically in a standard 35 mm size and format, is positioned in the camera take-up chamber. Most of the film is then pulled from the cartridge, positioned across an exposure plane and prewound into the film supply chamber. In use, camera mechanisms advance the prewound film sequentially, one frame for each picture, from the supply chamber across the exposure plane and into the cartridge in the take up chamber. The advancing mechanism typically is a thumb wheel that rotates a spool inside the cartridge, winding the film onto the spool and thereby drawing the film into the cartridge.

Although simple in construction, single use cameras include suitable mechanisms for metering the film to position the individual frames properly in the exposure position. Perforations along an edge of the film engage and drive a sprocket wheel when the film is advanced. The sprocket wheel includes a notched metering cam that rotates with the sprocket, one revolution for each film frame. When a film frame is properly positioned for exposure, an arm on a film metering lever pivots into the notch. This pivotal motion moves another arm on the same lever into engagement with teeth around the periphery of the thumb wheel and thereby prevents further film advance.

An exposure is initiated by depressing an actuation button that releases a latch constraining a high energy striker. The striker drives a shutter blade to open an exposure aperture and expose the film. The striker also pivots the metering lever from the cam notch, releasing the thumb wheel. The thumb wheel is then free to advance the film for the next successive exposure, rotating the sprocket in engagement with the film perforations and resetting the high energy striker for the next exposure.

A single use camera of the type described above is disclosed, for example, in U.S. Pat. No. 5,235,366, issued Aug. 10, 1993.

Single use cameras offer numerous advantages for amateur photographers, including many features first introduced in more expensive camera models. At the same time, however, other features have proven difficult to adapt to the single use format. Motor driven automatic film winding and metering, for example, is not widely available in existing single use cameras.

SUMMARY OF THE INVENTION

The present invention is directed to a photographic camera including an improved film winding and metering mechanism, and particularly to such a mechanism driven by an electric motor. Briefly summarized, according to one aspect of the invention, a metering linkage and an exposure initiation member are provided with extensions that interact: a) blocking the linkage from energizing a film winding motor in one position of the member; and, b) releasing the linkage to energize the motor in another position of the member. The first or blocking position corresponds to depression of the member to initiate an exposure. The second or releasing position corresponds to the return of the member to its undepressed condition after initiating the exposure.

According to more specific features, the exposure initiation member includes a first tab and the metering linkage includes a second tab. In the depressed position of the member, the first and second tabs respectively engage each other, blocking movement of the linkage and thereby preventing energization of the motor. In the non-depressed position of the member, the first and second tabs respectively clear each other, releasing the linkage and energizing the motor. The motor then advances the film and resets the metering linkage. Resetting the linkage deenergizes the motor and interrupts the film advance at the completion of the metering cycle.

Still more specifically, the camera includes a high energy striker, a shutter actuator moveable between a first position latching the striker and a second position releasing said striker, an electric film advancing motor, and a metering linkage for metering the advance of successive film frames into an exposure position. The metering linkage is biased to operate a switch which energizes the film advancing motor, but depression of the shutter actuator blocks the linkage against the bias, preventing energization of the motor until the shutter actuator is released. This frees the linkage, which closes the switch and energizes the motor.

These and other features and advantages of the invention will be more clearly understood and appreciated from a review of the following detailed description of the preferred embodiments and appended claims, and by reference to the accompanying drawings.

DETAILED DESCRIPTION OF THE INVENTION

Figure 1:
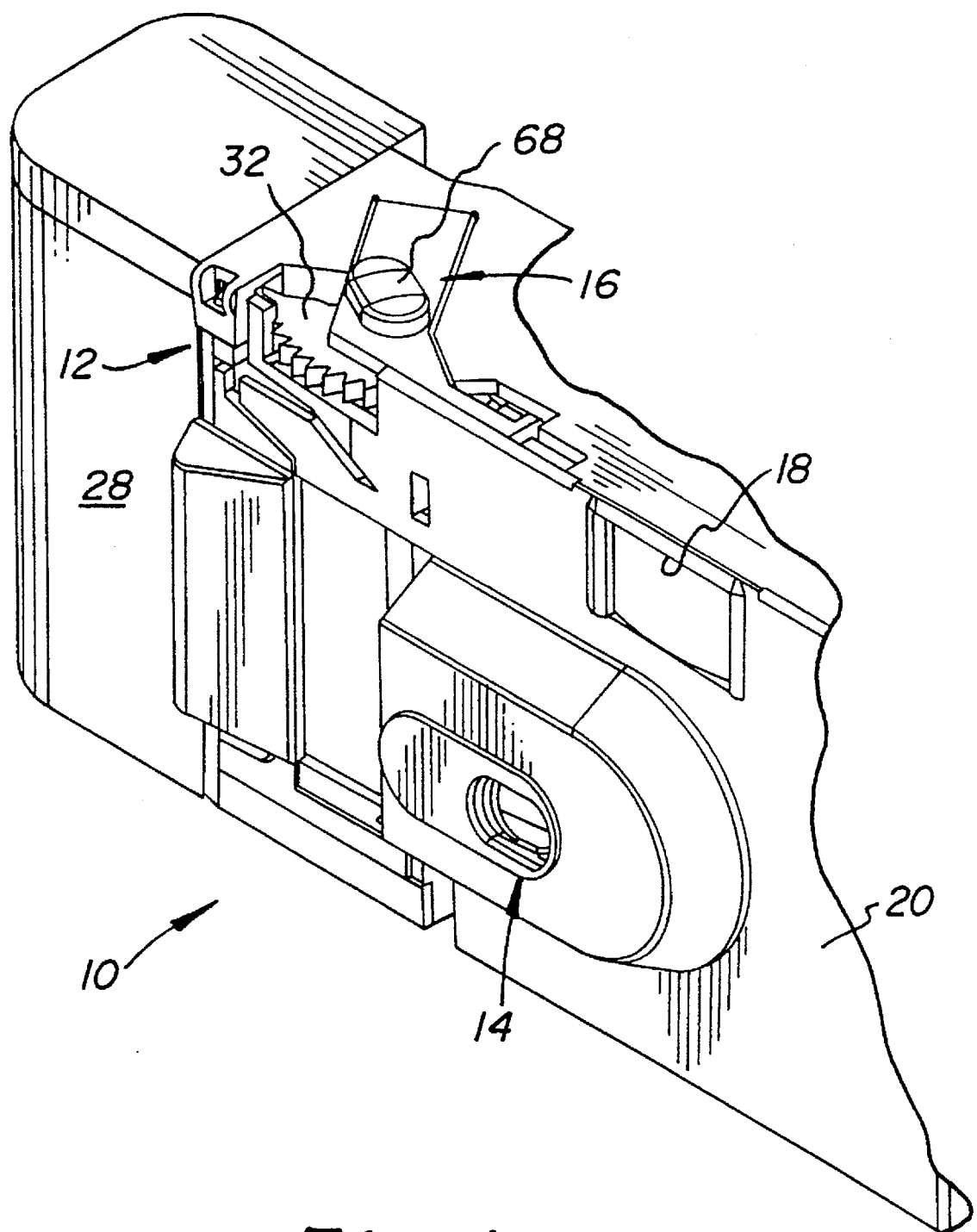
FIG. 1 is a partial front perspective view of a camera including an improved film advancing and metering mechanism in accordance with a preferred embodiment of the invention.
Figure 2:
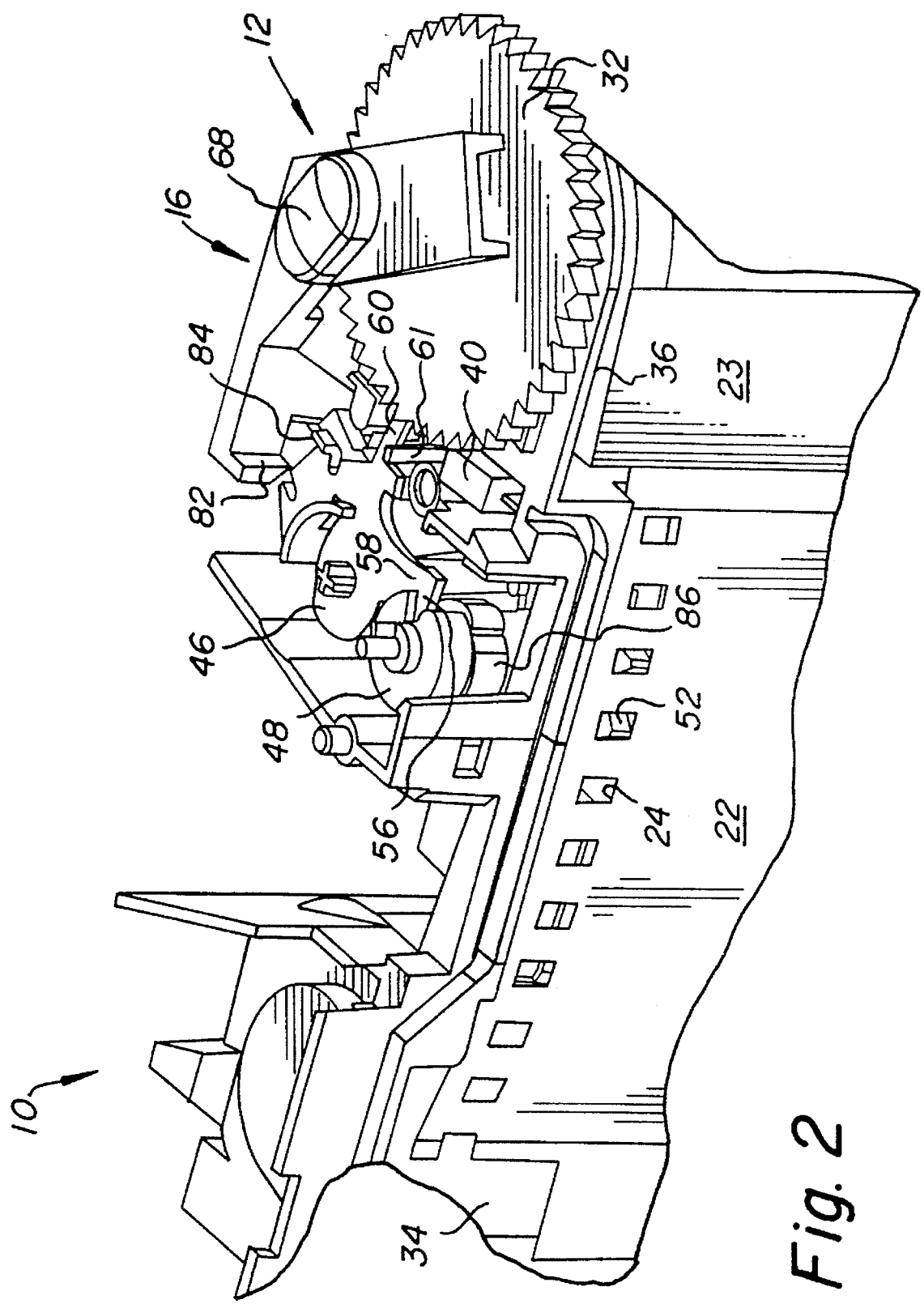
FIG. 2 is a back perspective view of the camera of FIG. 1, with parts removed, showing a portion of the film advancing and metering mechanism in more detail.
Figure 10:
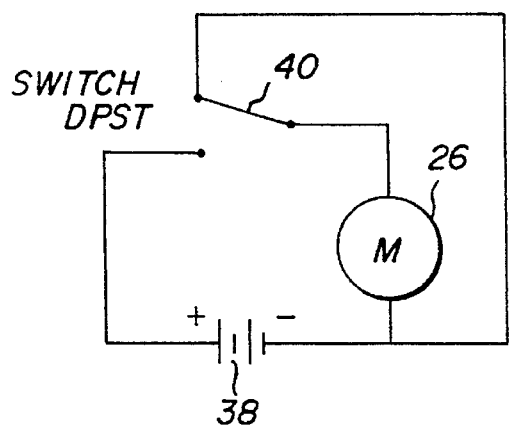
FIG. 10 is a schematic view of a film winding motor and energizing switch used in the preferred embodiment.

Referring now to the drawings, and beginning with FIGS. 1, 2 and 10, a single use camera 10 is depicted including a film advancing and metering mechanism 12, an exposure mechanism 14, actuated by exposure initiating member 16, and a viewfinder 18, all enclosed in a camera casing 20.

The preferred camera 10 is intended for use with a standard film format, such as thirty five millimeter film 22 in a standard cartridge 23. At least one edge of the film 22 defines a row of perforations 24, having a predetermined pitch between adjacent perforations. Of course other film formats will be appropriate for use with other embodiments of the invention.

The film advancing and metering mechanism 12 includes driving components and metering components. Although they work together, the driving components generally move the film while the metering components control the movement to position respective frames, one after another, in a proper exposure position. The driving components include an electric motor 26 (FIG. 10) contained in a housing 28 (FIG. 1), and a gear train 30 including top gear 32. When the motor 26 is energized, it rotates the gear train 30, advancing the film from a supply chamber 34 across an exposure position and into a take-up chamber 36. The cartridge 23, which is in the take-up chamber, includes a slotted spool adapted to mate with a dog on the gear train so rotation of the gear train will turn the spool, winding the film onto the spool and pulling the film into the cartridge.

Electric motor 26 is powered by batteries 38 (FIG. 10) coupled to the motor through a switch 40 and circuit 42. It will become apparent from the following description that the metering components of the film advancing and metering mechanism 12 operate through the switch 40 and circuit 42, advancing the film at appropriate times between exposures and by appropriate amounts corresponding to the pitch between adjacent exposure frames.

Figures 3, 4:
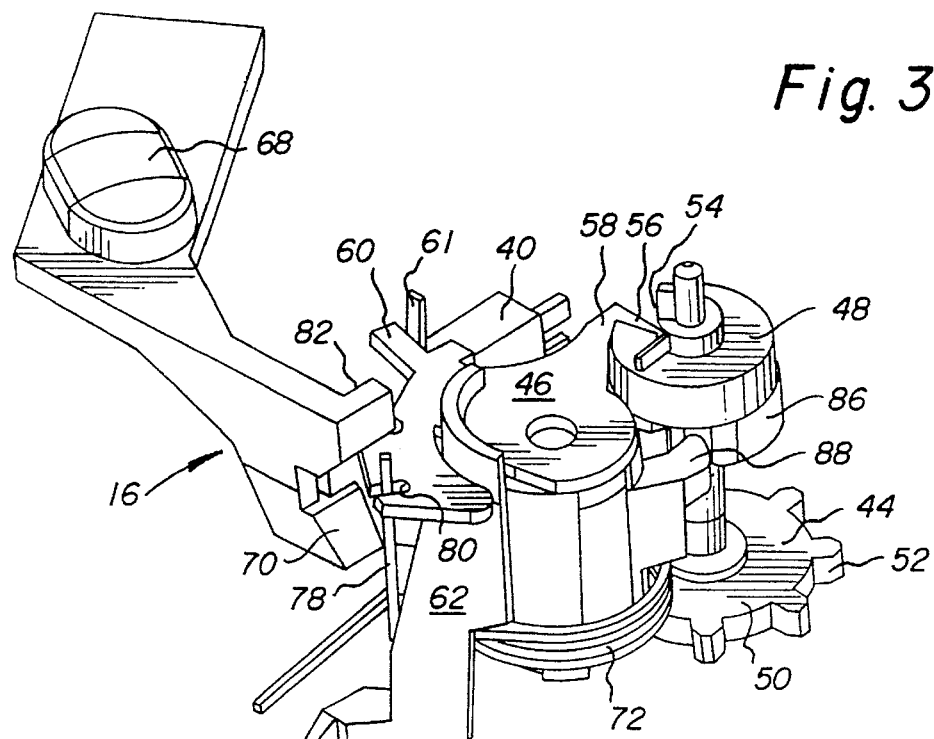
FIG. 3 is a front perspective view of a portion of the film advancing and metering mechanism of the preferred embodiment with the mechanism depicted in positions before an exposure is initiated.
FIG. 4 is a partial back perspective view showing a portion of the film advancing and metering mechanism in positions corresponding to FIG. 3.

The film metering components include sprocket 44 (FIG. 3), metering lever 46 and cam 48. Sprocket 44 defines a hub 50 with projections 52 that engage and extend into the perforations 24 along the edge of the film 22. The perforations are arranged according to the standard 35 mm format, and the sprocket projections 52 are designed with a circumferential spacing equal to the distance between the perforations. When the film advancing and metering mechanism 12 moves the film from the supply chamber 34 toward the cartridge, engagement between the film perforations 24 and sprocket projections 52 drives the sprocket in a counterclockwise direction as viewed in FIG. 2. One complete revolution of the sprocket corresponds to the pitch between adjacent film frames, or the distance the film moves between each sequential exposure.

Cam 48 is secured to and rotates with the sprocket 44, one revolution for each film frame or exposure sequence, and is notched at 54 for purposes to be described next.

Metering lever 46 is mounted for pivotal movement and is biased clockwise. A hook 56 on an arm or follower portion 58 of the metering lever 46 engages and follows the circumferential surface of cam 48. When the notch 54 in cam 48 rotates into alignment with hook 56, the hook drops into the notch 54, rotating the lever clockwise. Clockwise rotation of the metering lever 46 moves an oppositely extending arm or extension 60 into engagement with a contact lever 61 of switch 40, eventually opening the switch and deenergizing the motor 26.

Exposure mechanism 14 includes the exposure initiating member 16, a high energy lever or striker 62, a shutter 64 and an exposure aperture 66.

The exposure initiation member is a resilient part coupled to the camera housing and including a button 68 and latch 70, both on a flexible arm. The button is depressable against the resilient bias of the arm to move the latch 70 from a latching position to a releasing position.

FIGS. 1–4 depict the various camera mechanisms in positions just prior to the initiation of an exposure. Exposure initiation member 16 is in the non-depressed or latching position. The switch 40 is held open by the metering lever 46, and the film advancing motor 26 (FIG. 10) is deenergized. The same mechanisms are depicted in FIGS. 5 and 6 in positions just after depression of the shutter initiating member 16 to start an exposure cycle, and in FIGS. 7 and 8 in positions later in the cycle when the exposure initiating member 16 has been released and returned to its non-depressed position.

Figure 5:
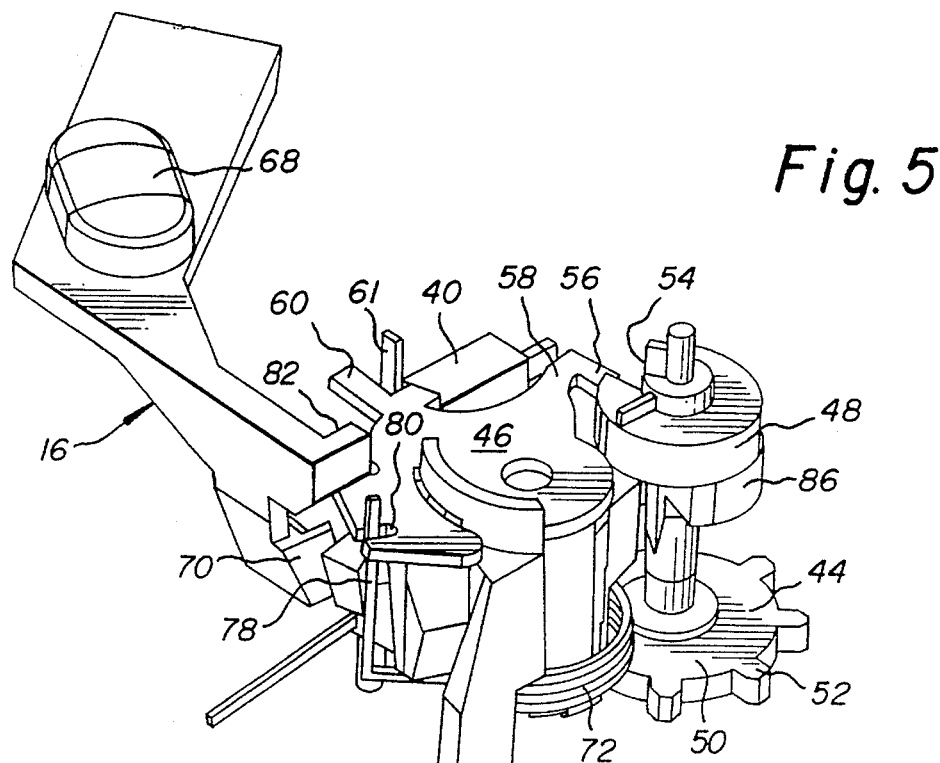
FIG. 5 is a front perspective view of portions of the film advancing and metering mechanism of the preferred embodiment with the mechanism depicted in positions after an exposure is initiated but before the exposure actuation member is released.
Figure 6:
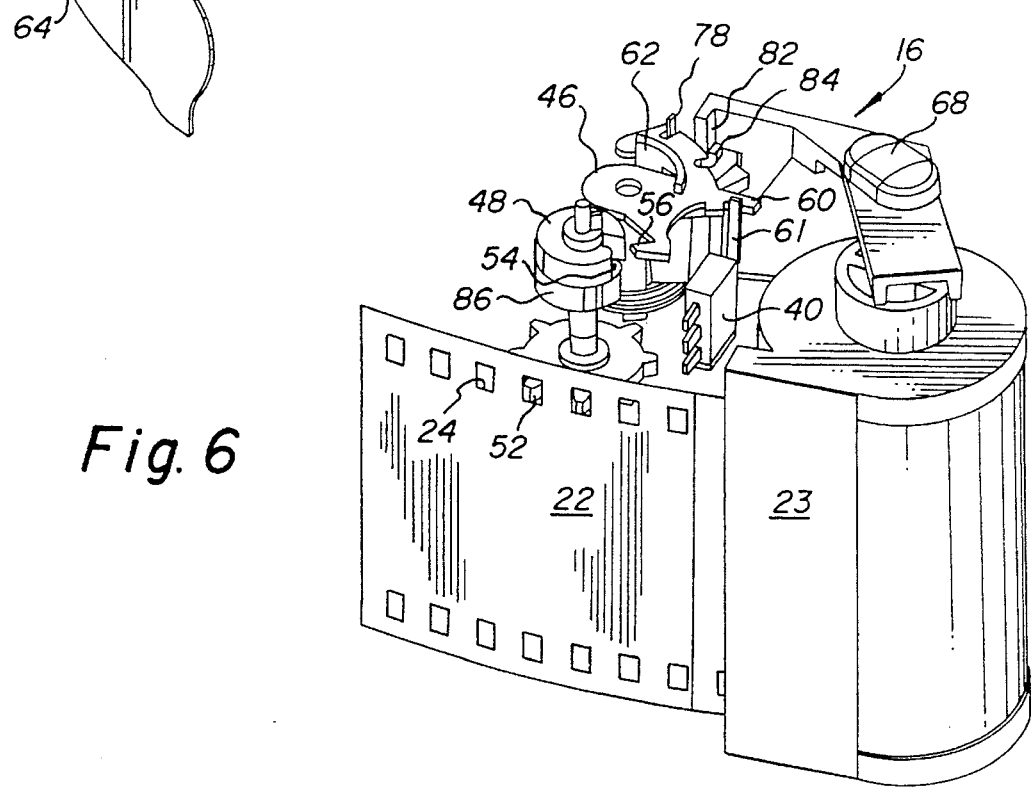
FIG. 6 is a partial back perspective view showing a portion of the film advancing and metering mechanism in positions corresponding to FIG. 5.

Referring now to FIGS. 5 and 6, depression of the exposure initiating member 16 releases the high energy lever 62, which pivots rapidly about a vertical axis under the relatively strong bias of a high energy spring 72. The lever moves rapidly into striking engagement with a shutter abutment 74, driving the shutter clockwise and uncovering exposure aperture 66, exposing the film. The released position of the high energy lever and the open position of the shutter are depicted in FIG. 5. The exposure cycle is completed when the shutter returns to its original position under the influence of spring 76 (FIG. 5).

Figure 7:
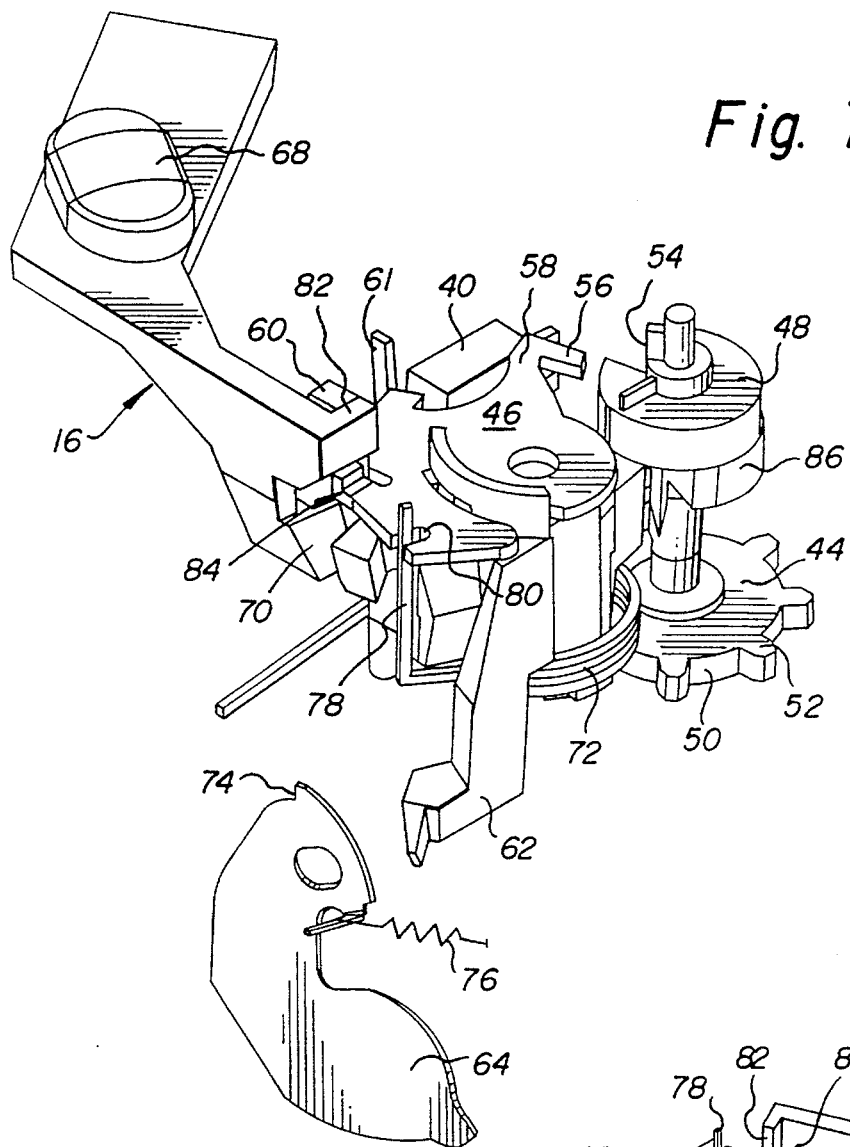
FIG. 7 is a front perspective view of portions of the film advancing and metering mechanism of the preferred embodiment with the mechanism depicted in positions after an exposure is initiated and the exposure actuation member is released.
Figure 8:
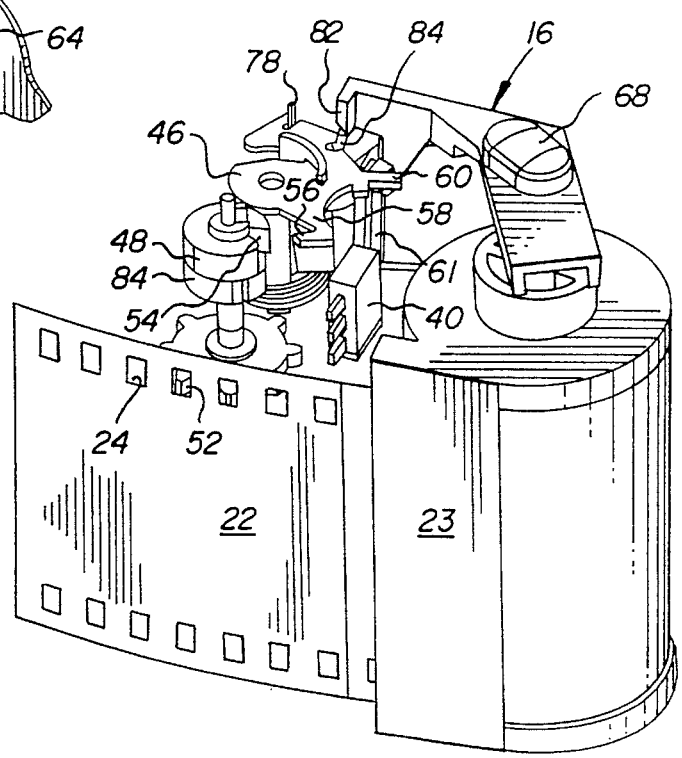
FIG. 8 is a partial back perspective view showing a portion of the film advancing and metering mechanism in positions corresponding to FIG. 7.
Figure 9:
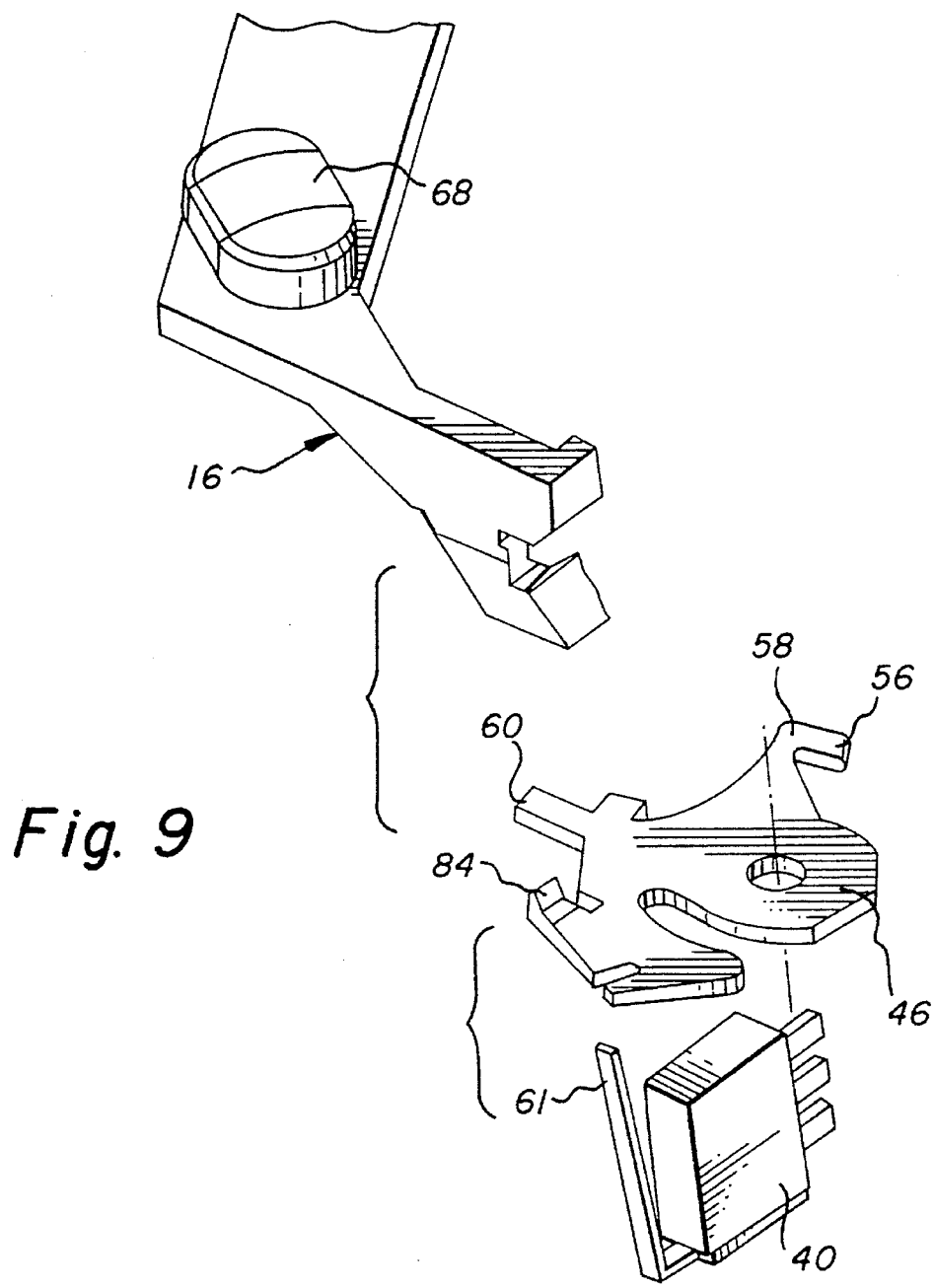
FIG. 9 is an exploded view depicting parts of the film advancing and metering mechanism.

When the high energy lever rotates counterclockwise as viewed in FIG. 5, a leg 78 on the high energy spring 72 biases the metering lever 46 counterclockwise through engagement with a notch 80 in the metering lever 46. This counterclockwise bias of the high energy spring is stronger than the previously mentioned clockwise bias on the lever 62, and disengages hook 56 on arm 58 from notch 54 in cam 48. The spring leg 78 also biases extension or arm 60 away from contact lever 61 of switch 40, in a direction that will close the switch 40, energize the motor 26 and advance the film for the next successive exposure. Full rotation of the metering lever is delayed, however, by engagement between tabs 82 and 84, respectively, on the exposure initiation member 16 and the metering lever 46. The tabs 82 and 84 are configured and positioned to engage each other, blocking counterclockwise rotation of the metering lever as long as the exposure initiation member is in its down or depressed position. Then, when the exposure initiation member is released, as depicted in FIGS. 7 and 8, the tabs disengage, and the metering lever is freed to rotate counterclockwise, closing switch 40 and energizing motor 26 to advance the film. Movement of the film again drives sprocket 44 and a second cam 86 secured to the sprocket coaxial with cam 48. The second cam engages an extension 88 (FIG. 3) of the high energy lever and rotates the lever, returning it to its latched position behind latch 70. At the same time, the high energy lever engages and returns the metering lever 46 to its original position, reengaging extension 60 with switch contact lever 61, opening the switch 40 and deenergizing motor 26 when the next successive film frame is in the exposure position.

It should now be apparent that an improved camera is disclosed having an actuator that is moveable from a first position to a second position to initiate a film exposing cycle, and from the second position to the first position to initiate a camera setting or resetting cycle. The setting or resetting cycle includes metering movement of the film to position successive film frames for exposure. The actuator operates through a metering linkage and film advancing motor. Depression of the actuator initiates the exposure cycle and simultaneously blocks the metering linkage from energizing the motor. Only when the actuator is returned to its original position is the metering linkage released to energize the motor and advance the film. The metering cycle then runs to completion, setting the various camera mechanisms for the next exposure and deenergizing the motor.

While the invention is described in connection with a preferred embodiment, other modifications and applications will occur to those skilled in the art. The claims should be interpreted to fairly cover all such modifications and applications within the true spirit and scope of the invention.

PARTS LIST

Reference No.—Part
10. Camera
12. Film advancing and metering mechanism
14. Exposure mechanism
16. Exposure initiation member
18. Viewfinder
20. Camera casing
22. Film
23. Cartridge
24. Metering perforations
26. Electric motor
28. Motor housing
30. Gear train
32. Top gear
34. Supply chamber
36. Take-up chamber
38. Batteries
40. Switch
42. Circuit
44. Sprocket
46. Metering lever
48. Metering cam
50. Cam hub
52. Cam projections or teeth
54. Cam notch
56. Hook
58. Cam follower
60. Arm or extension
61. Switch contact lever
62. High energy lever
64. Shutter
66. Aperture
68. Actuation button
70. Latch
72. Spring
74. Abutment
76. Spring
78. Spring leg
80. Notch
82. Tab
84. Tab
86. Second or resetting cam
88. cam follower

We claim:

1. A photographic camera including an exposure initiating member moveable between depressed and returned positions, a film advancing motor, and metering linkage for metering the advance of successive film frames into an exposure position; characterized in that:

said metering linkage operates said film advancing motor, depression of said exposure initiating member blocks said linkage from energizing said motor and return of said exposure initiating member releases said linkage to energize said motor.

2. The invention of claim 1, wherein said exposure initiation member includes a first tab and said metering linkage includes a second tab, said first and second tabs respectively engage each other in the depressed position of said member, blocking said linkage and thereby preventing energization of said motor, and said first and second tabs respectively clear each other in the returned position of said member, releasing said linkage and thereby energizing said motor.

3. The invention of claim 1, wherein said film advancing motor resets said metering linkage and said resetting of said metering linkage deenergizes said motor, interrupting said film advance.

4. A photographic camera including a high energy lever, a shutter release moveable between a first position latching said lever and a second position releasing said lever, an electric film advancing motor, and a metering linkage for metering the advance of successive film frames into an exposure position; characterized in that:

said metering linkage is biased to operate a switch energizing said film advancing motor, said shutter release in said second position blocks said linkage against said bias, and said shutter release in said first position releases said linkage closing said switch and energizing said motor.

5. The invention of claim 4, wherein said film advancing motor resets said metering linkage and said resetting of said metering linkage deenergizes said motor, interrupting said film advance.

6. A photographic camera having a film exposing cycle followed by a camera setting cycle, said camera including a moveable actuator for initiating said cycles and an electric film advancing motor operated only during said setting cycle; characterized in that:

movement of said actuator from a first position to a second position initiates said film exposing cycle, and from said second position to said first position initiates said camera setting cycle.

7. The invention of claim 6, wherein said actuator operates to initiate said camera setting cycle through a metering linkage biased to open a switch to energize said motor, and said actuator blocks said linkage in said first position and releases said linkage in said second position.

8. The invention of claim 7, wherein said linkage includes a film metering mechanism that controls film advance during said setting cycle and interrupts said energization of said motor when a next successive film frame is properly positioned for exposure.

9. The invention of claim 8, wherein said motor is energized through a switch, said film metering mechanism includes a pivotal plate between said actuator and said switch, and said actuator blocks pivoting of said plate in said second position of said actuator, releasing said plate for pivoting in said first position of said actuator.

10. A camera for exposing successive frames of photographic film in an exposure position; said camera comprising:

a high energy lever releasable from a set position to drive open a shutter and expose the film;

a metering linkage for metering advancement of the film to position the respective frames successively in the exposure position;

an actuating member moveable between first and second positions, said actuating member in said second position releasing said high energy lever and blocking said metering linkage to prevent film advancement during the exposure, said actuating member in said first position releasing said metering linkage to advance the film after the exposure.

11. The invention of claim 10, wherein said camera includes a film advancing motor, said metering linkage is biased to operate a switch to energize said motor, said actuator in said second position blocks said linkage against said bias, and said actuator in said first position releases said linkage closing said switch and energizing said motor.

* * * * *